US011996258B2

(12) United States Patent
Miller

(10) Patent No.: US 11,996,258 B2
(45) **Date of Patent: *May 28, 2024**

(54) PLANAR FILAMENT WITH DIRECTED ELECTRON BEAM

(71) Applicant: Moxtek, Inc., Orem, UT (US)

(72) Inventor: Eric Miller, Provo, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,690

(22) Filed: Jun. 23, 2023

(65) Prior Publication Data

US 2023/0360876 A1 Nov. 9, 2023

Related U.S. Application Data

(63) Continuation of application No. 17/572,132, filed on Jan. 10, 2022, now Pat. No. 11,728,120.

(Continued)

(51) Int. Cl.
*H01J 35/06* (2006.01)

(52) U.S. Cl.
CPC .................................. *H01J 35/064* (2019.05)

(58) Field of Classification Search
CPC .................................................... H01J 35/064
See application file for complete search history.

(56) References Cited

U.S. PATENT DOCUMENTS 8,247,971 B1 8/2012 Bard et al.
11,728,120 B2 * 8/2023 Miller ................... H01J 35/064 378/138

(Continued)

*Primary Examiner* — Chih-Cheng Kao
(74) *Attorney, Agent, or Firm* — Thorpe North & Western, LLP.

(57) ABSTRACT

A planar filament 11$_f$ can include multiple materials to increase electron emission in desired directions and to suppress electron emission in undesired directions. The filament 11$_f$ can include a core-material CM between a top-material TM and a bottom-material BM. The top-material TM can have a lowest work function $WF_t$; the bottom-material BM can have a highest work function $WF_b$; and the core-material CM can have an intermediate work function $WF_c$ ($WF_t<WF_c<WF_b$). A width $W_t$ of the filament 11$_f$ at a top-side 31$_t$ can be greater than its width $W_b$ at a bottom-side 31$_b$ ($W_t>W_b$). This shape makes it easier to coat the edges 31$_e$ with the bottom-material BM, because the edges 31$_e$ tilt toward and partially face the sputter target. This shape also helps direct more electrons to a center of the target 14, and reduce electron emission in undesired directions.

20 Claims, 6 Drawing Sheets

Related U.S. Application Data

(60) Provisional application No. 63/147,969, filed on Feb. 10, 2021.

(56) References Cited

U.S. PATENT DOCUMENTS

| | | | | |
|---|---|---|---|---|
| 2010/0239828 | A1* | 9/2010 | Cornaby ............... | H01J 35/064 428/195.1 |
| 2015/0311025 | A1* | 10/2015 | Zou ....................... | H01J 35/064 378/136 |
| 2017/0092457 | A1 | 3/2017 | Harada et al. | |

* cited by examiner

PLANAR FILAMENT WITH DIRECTED ELECTRON BEAM

CLAIM OF PRIORITY

This application is a continuation of U.S. patent application Ser. No. 17/572,132, filed on Jan. 10, 2022, which claims priority to U.S. Provisional Patent Application No. 63/147,969, filed on Feb. 10, 2021, which are incorporated herein by reference.

FIELD OF THE INVENTION

The present application is related generally to x-ray sources.

BACKGROUND

X-rays have many uses, including imaging, x-ray fluorescence analysis, x-ray diffraction analysis, and electrostatic dissipation. A large voltage between a cathode and an anode of the x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (DRAWINGS MIGHT NOT BE DRAWN TO SCALE)

FIG. 1*a* is a cross-sectional side-view of a transmission-target x-ray tube 10*a* including a filament 11$_f$ configured to emit electrons in an electron beam 16 to a target 14. X-rays 17 can emit out of the x-ray tube 10*a* through the target 14 and an adjacent x-ray window 13.

FIG. 1*b* is a cross-sectional side-view of a transmission-target x-ray tube 10*b*, similar to x-ray tube 10*a*. X-ray tube 10*b* has a differently shaped anode 12 and electrically-insulative structure 15 than x-ray tube 10*a*.

FIG. 2 is a cross-sectional side-view of a reflective-target, side-window x-ray tube 20 including a filament 11$_f$ configured to emit electrons in an electron beam 16 to a target 14. The target 14 can be configured to emit x-rays 17 through an interior of the x-ray tube 20, and out of the x-ray tube 20 through an x-ray window 13.

Figure 5A:
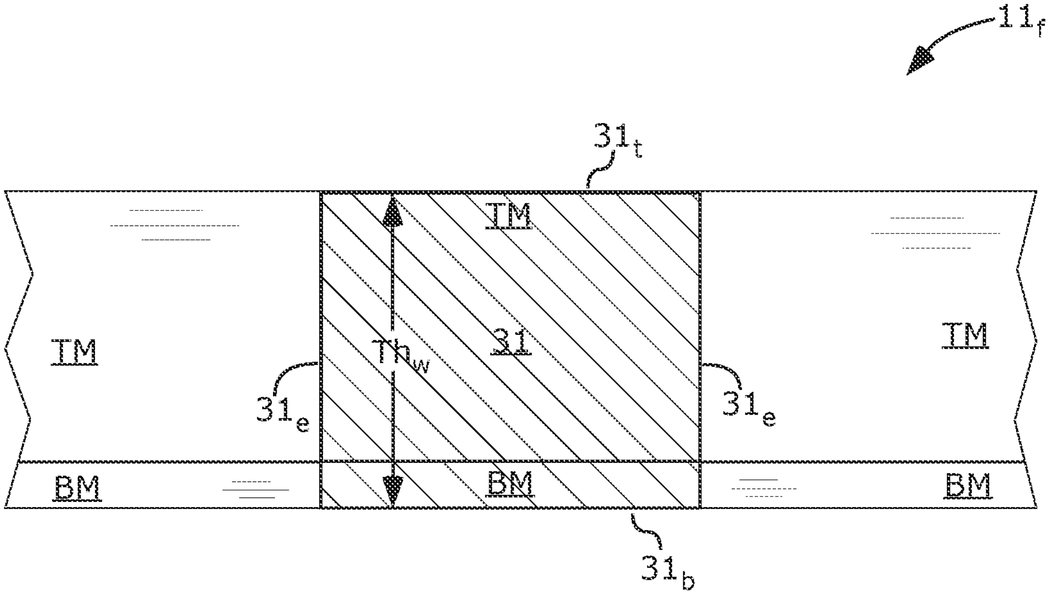

FIG. 5*a* is a cross-sectional side-view of a portion of a wire 31 of a filament 11$_f$, with a top-material TM at a top-side 31 and a bottom-material BM at a bottom-side 31$_b$.

Figure 5B:
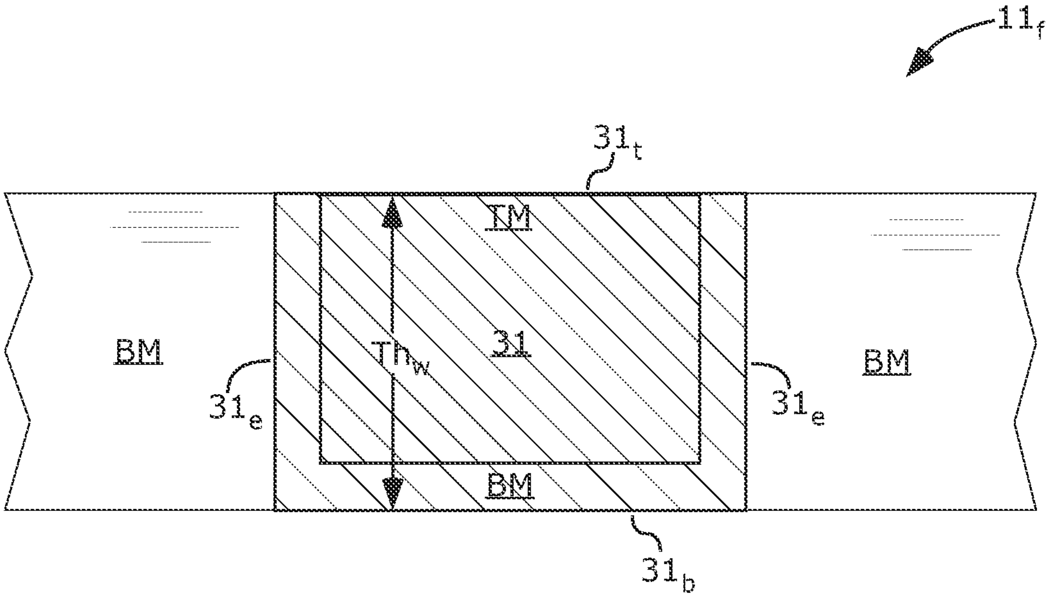

FIG. 5*b* is a cross-sectional side-view of a portion of a wire 31 of a filament 11$_f$, with a top-material TM at a top-side 31*t*, and with a bottom-material BM at a bottom-side 31*b* and at two edges 31$_e$.

Figure 6A:
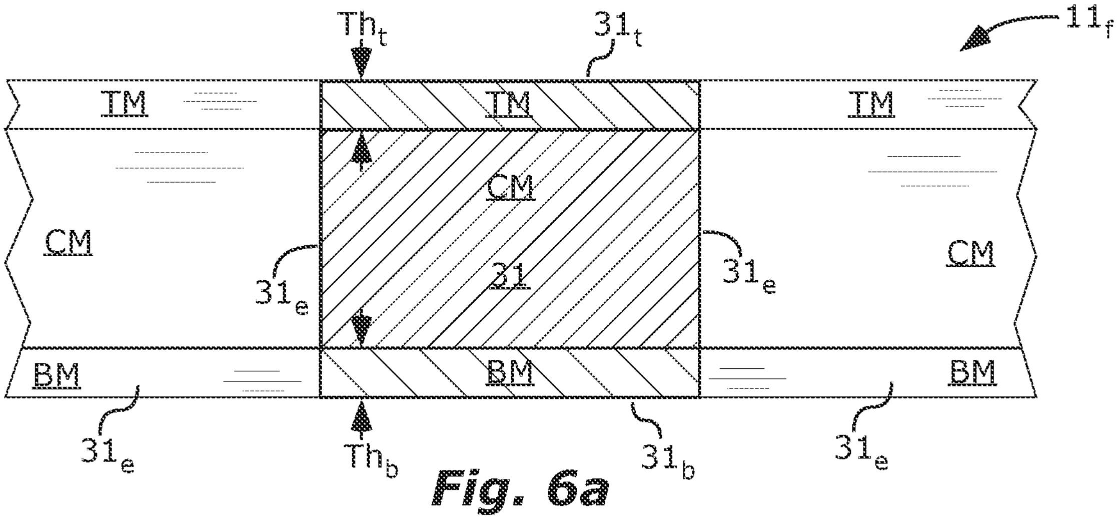

FIG. 6*a* is a cross-sectional side-view of a portion of a wire 31 of a filament 11$_f$, with a top-material TM at a top-side 31$_t$, a bottom-material BM at a bottom-side 31$_b$, and a core-material CM between the top-material TM and the bottom-material BM.

Figure 6B:
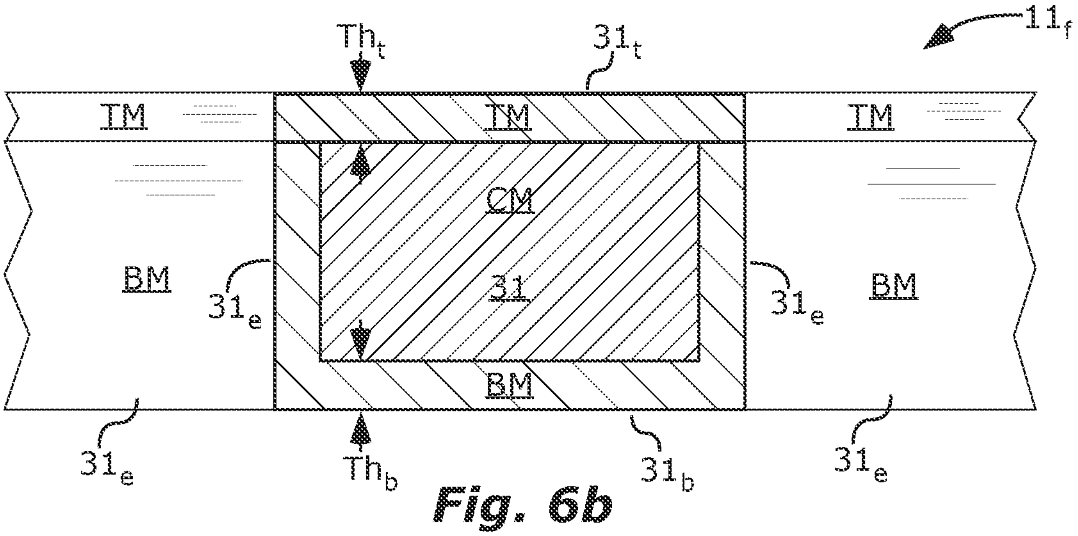

FIG. 6*b* is a cross-sectional side-view of a portion of a wire 31 of a filament 11$_f$, with a top-material TM at a top-side 31$_t$, a bottom-material BM at a bottom-side 31$_b$ and at two edges 31$_e$, and a core-material CM between the top-material TM and the bottom-material BM.

Figure 6C:
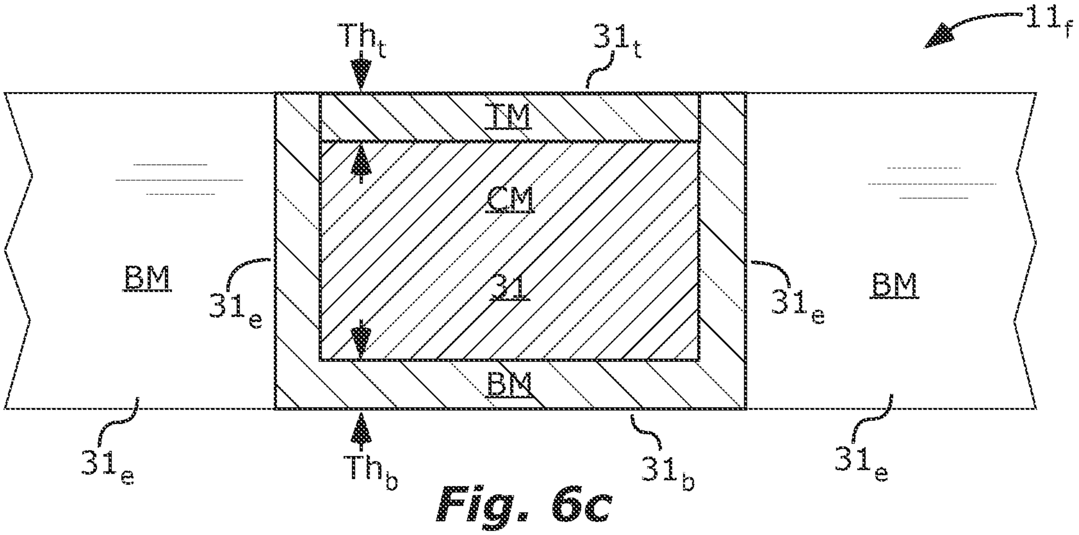

FIG. 6*c* is a cross-sectional side-view of a portion of a wire 31 of a filament 11$_f$, with a top-material TM at a top-side 31$_t$, a bottom-material BM at a bottom-side 31$_b$ and at two edges 31$_e$, and a core-material CM between the top-material TM and the bottom-material BM.

Figure 7:
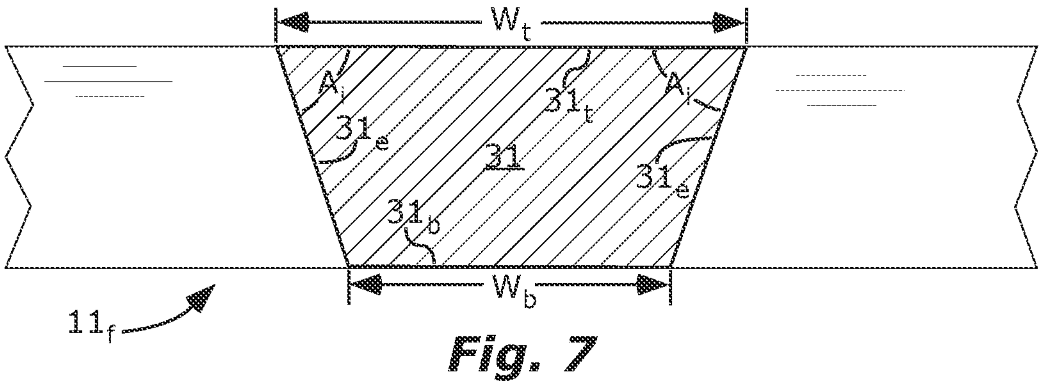

FIG. 7 is a cross-sectional side-view of a portion of a wire 31 of a filament 11$_f$, with a width $W_t$ at the top-side 31$_t$ that is greater than a width $W_b$ at the bottom-side 31$_b$.

Figure 8A:
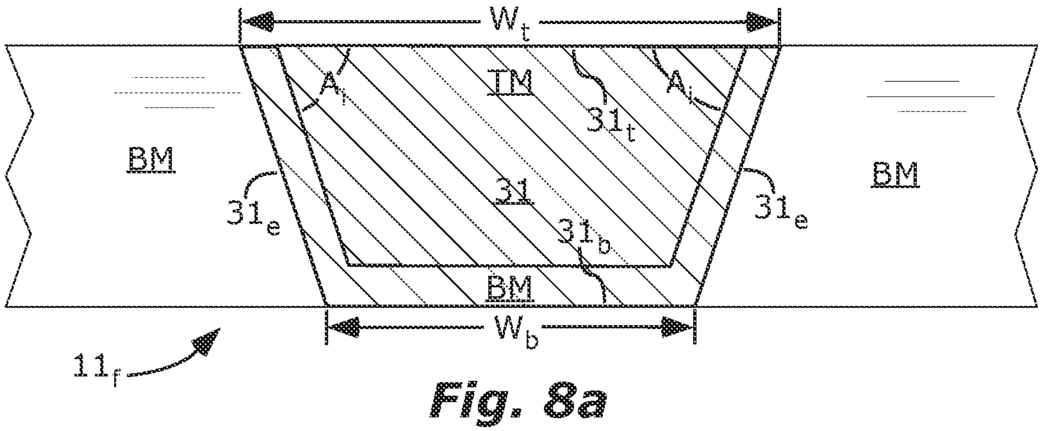

FIG. 8*a* is a cross-sectional side-view of a portion of a wire 31 of a filament 11$_f$, with combined features from FIGS. 5*b* and 7.

Figure 8B:
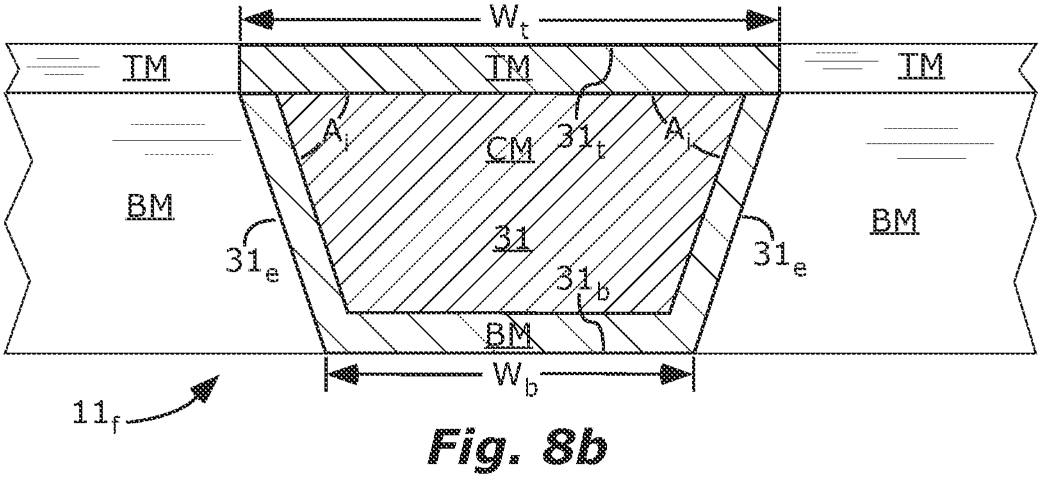

FIG. 8*b* is a cross-sectional side-view of a portion of a wire 31 of a filament 11$_f$, with combined features from FIGS. 6*b* and 7.

Figure 9:
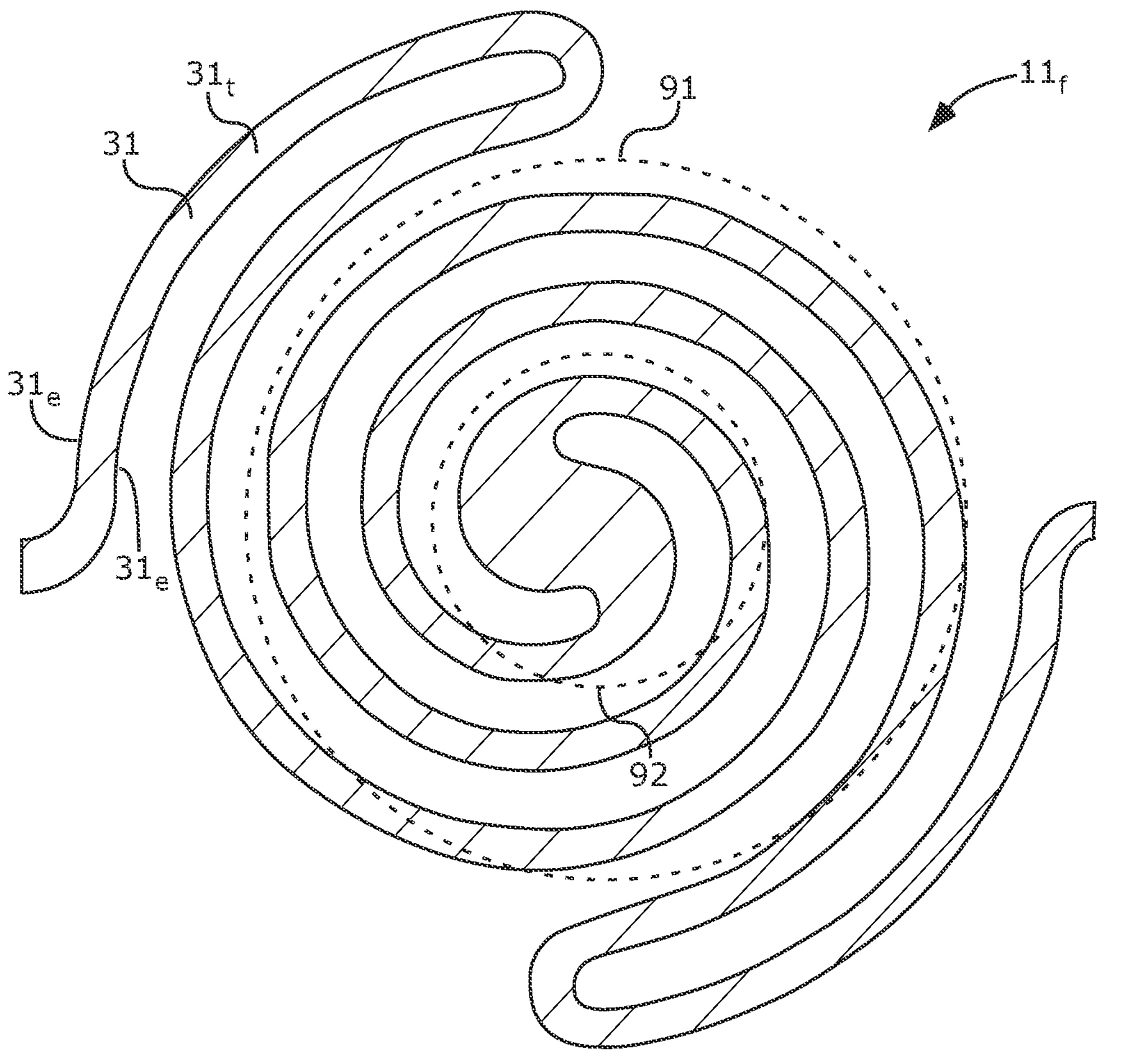

FIG. 9 is a top-view of a filament 11$_f$, with central regions 91 and 92.

Figure 10:
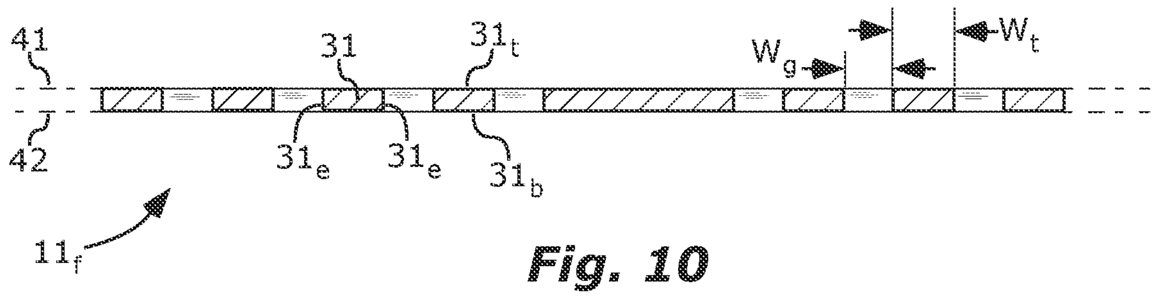

FIG. 10 is a cross-sectional side-view of a filament 11$_f$, with wire width $W_t$ greater than a gap width $W_g$ between adjacent wires 31 ($W_t > W_g$).

DEFINITIONS

The following definitions, including plurals of the same, apply throughout this patent application.

Figure 3:
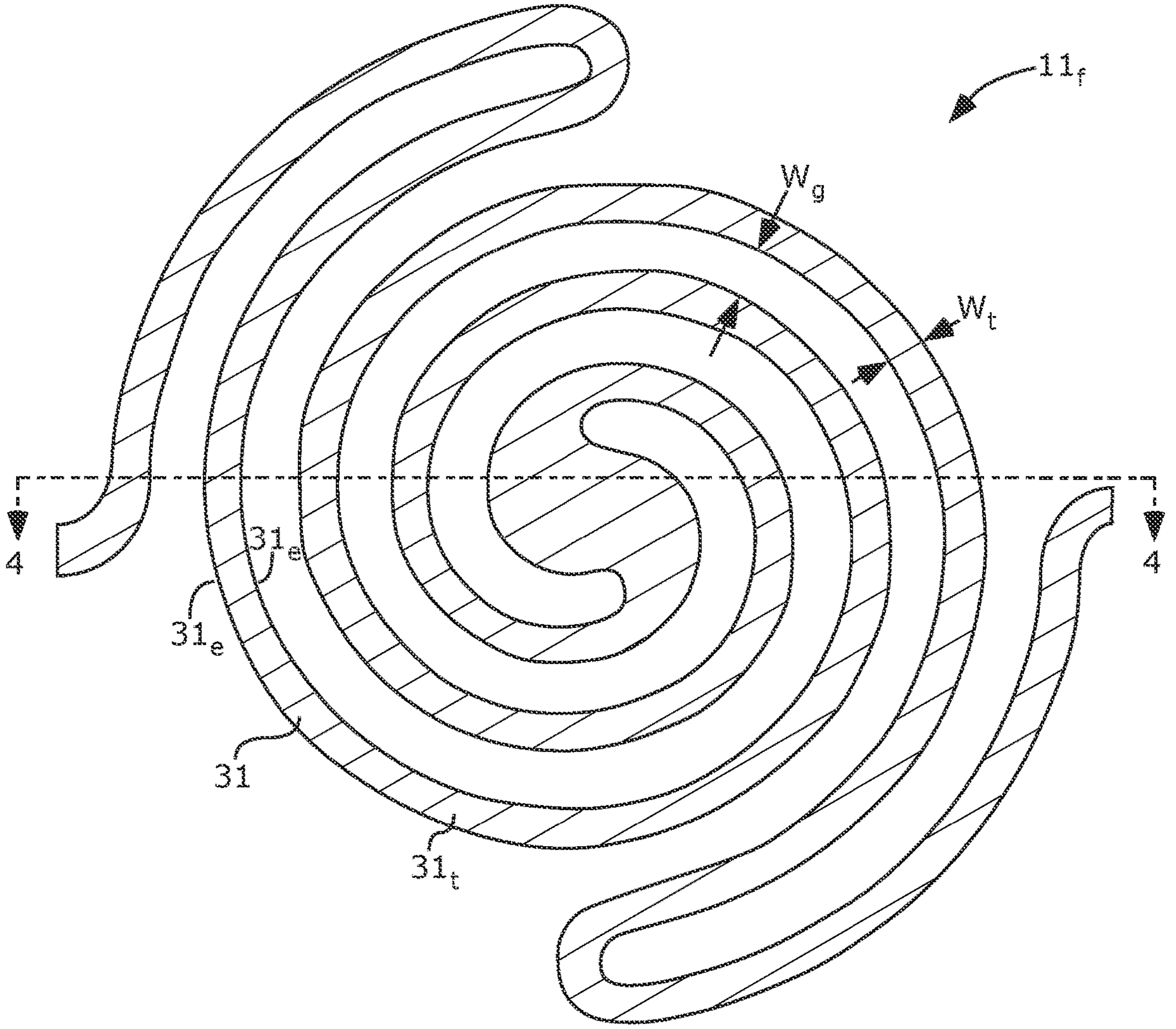
FIG. 3 is a top-view of a filament 11$_f$, with spiral and serpentine shapes.
Figure 4:
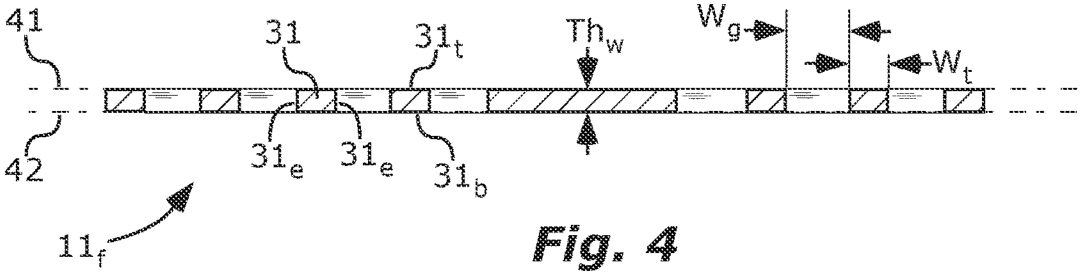
FIG. 4 is a cross-sectional side-view of the filament 11$_f$ of FIG. 3, taken along line 4-4 in FIG. 3.

As used herein, the term "elongated" means that wire length is substantially greater than wire width $W_t$ (FIGS. 3-4) and wire thickness $Th_w$ (FIG. 4). For example, wire length can be ≥5 times, ≥10 times, ≥100 times, or ≥1000 times larger than wire width $W_t$, wire thickness $Th_w$, or both.

As used herein, aligned with a plane (e.g. "aligned with a first plane" or "aligned with a second plane") means exactly aligned; aligned within normal manufacturing tolerances; or almost exactly aligned, such that any deviation from exactly aligned would have negligible effect for ordinary use of the device.

As used herein, the term "parallel" means exactly parallel, or within 10° of exactly parallel. The term "parallel" can mean within 0.1°, within 1°, or within 5° of exactly parallel if explicitly so stated in the claims.

As used herein, the term "unparallel" means the lines or surfaces intersect at an angle greater than 10°.

As used herein, the term "perpendicular" means exactly perpendicular, or within 10° of exactly perpendicular. The term "perpendicular" can mean within 0.1°, within 1°, or within 5° of exactly perpendicular if explicitly so stated in the claims.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "μm" means micrometer(s).

Unless explicitly noted otherwise herein, all temperature-dependent values are such values at 25° C.

DETAILED DESCRIPTION

An x-ray tube can make x-rays by sending electrons, in an electron-beam, across a voltage differential, to a target.

A small electron spot and a controlled electron spot on the target are useful features of x-ray tubes. A small electron spot and a controlled electron spot can improve x-ray imaging and x-ray diffraction spectroscopy.

A lower filament temperature is another useful feature. Filaments last longer at lower temperatures. Thus, x-ray tube life can increase, resulting in improved reliability and less waste.

Reduced x-ray tube power consumption is another useful feature. Improved filament efficiency can reduce x-ray tube power consumption. Thus, any adverse impact on the environment, due to electrical power consumption, is reduced. Also, battery size of a portable x-ray source can be reduced, which can reduce operator fatigue and improve ergonomics of x-ray tube usage.

The present invention is directed to various x-ray tubes that satisfy the needs of— small electron spot,
controlled electron spot,
lower filament temperature,
reduced electrical power consumption,
green/environmentally-friendly, and
improved ergonomics.

Each x-ray tube may satisfy one, some, or all of these needs.

Figure 1A:
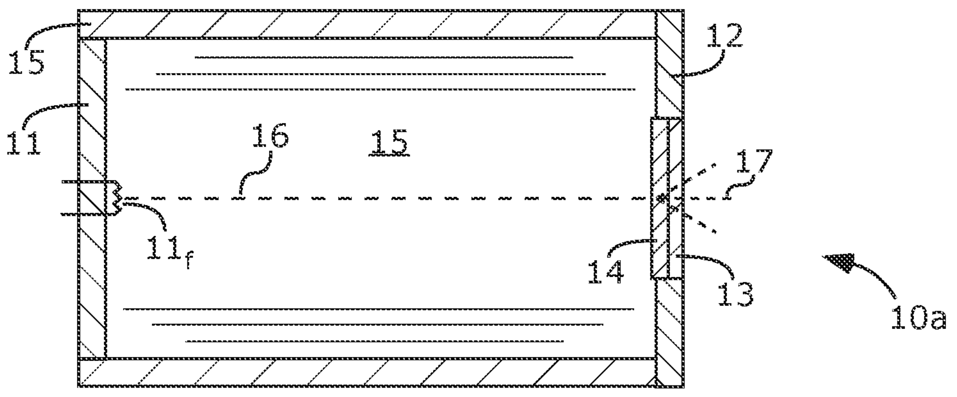
Figure 1B:
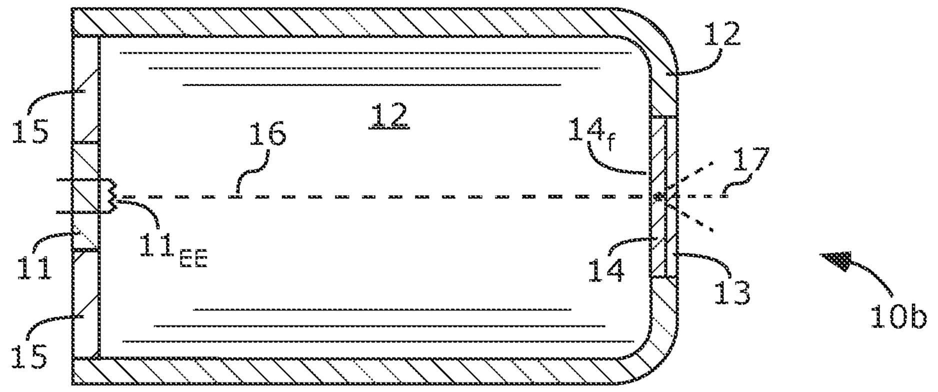
Figure 2:
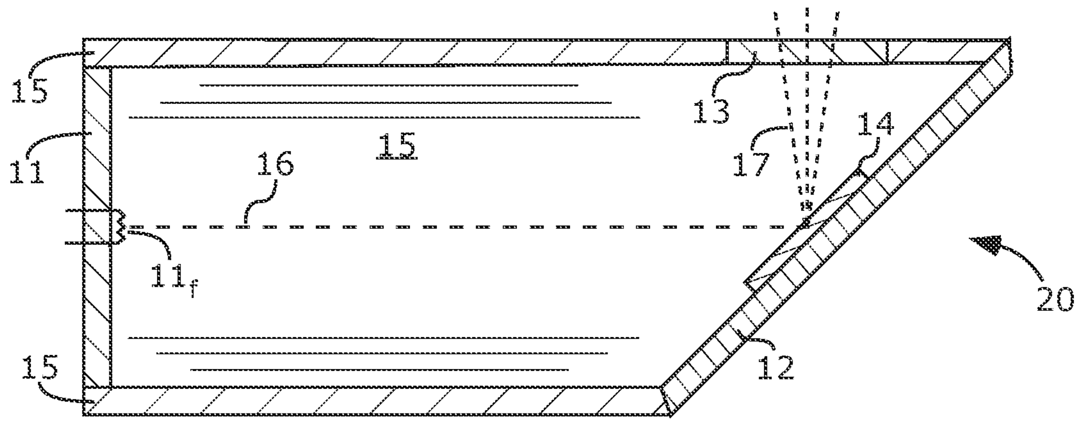

As illustrated in FIGS. 1*a*-2, x-ray tubes 10*a*, 10*b*, and 20 are shown with a cathode 11 and an anode 12 electrically-insulated from each other. An electrically-insulative structure 15 can separate and electrically-insulate the cathode 11 from the anode 12. The structure 15 (FIGS. 1*a* and 2) can be a cylinder and can have an evacuated interior between the cathode 11 and the anode 12. Example materials for the electrically-insulative structure 15 include glass, ceramic, or both.

The cathode 11 can include a filament $\mathbf{11}_f$, which can be heated by an electric current. This heat and/or a voltage differential between the cathode 11 and the anode 12 can cause the filament $\mathbf{11}_f$ to emit electrons in an electron beam 16 to a target 14. The target 14 can include a material for generation of x-rays 17 in response to impinging electrons from the filament $\mathbf{11}_f$.

In the transmission-target x-ray tubes 10*a* and 10*b* of FIGS. 1*a* and 1*b*, the target 14 can adjoin an x-ray window 13. The x-rays 17 can emit out of x-ray tubes 10*a* and 10*b* from the target 14 through the x-ray window 13.

In the reflective-target, side-window x-ray tube 20 of FIG. 2, the target 14 can be spaced apart from the x-ray window 13. The x-rays 17 can emit from the target 14 through an interior of the x-ray tube 20, and out of the x-ray tube 20 through an x-ray window 13.

Shape and materials of the filament $\mathbf{11}_f$ can be selected for a small electron spot on the target 14, a controlled electron spot on the target 14, a lower temperature of the filament $\mathbf{11}_f$, improved filament efficiency, or combinations thereof. As illustrated in FIGS. 3-4, the filament $\mathbf{11}_f$ can be an elongated wire 31. The filament $\mathbf{11}_f$ can be flat or planar. The wire 31 can include a spiral-shape, a serpentine-shape, or both.

The filament $\mathbf{11}_f$ can include (a) a top-side $\mathbf{31}_t$; (b) a bottom-side $\mathbf{31}_b$ opposite of the top-side $\mathbf{31}_t$; and (c) two edges $\mathbf{31}_e$, opposite of each other, extending between the top-side $\mathbf{31}_t$ and the bottom-side $\mathbf{31}_b$. The top-side $\mathbf{31}_t$ can face the target 14. The bottom-side $\mathbf{31}_b$ can face away from the target 14. The top-side 31 can be aligned with a first plane 41. The bottom-side $\mathbf{31}_b$ can be aligned with a second plane 42. The first plane 41 can be parallel to the second plane 42.

As illustrated in FIGS. 5*a*-6*c* and 8*a*-8*b*, the filament $\mathbf{11}_f$ can be made of multiple, different materials to increase electron emission in desired directions and to suppress electron emission in undesired directions. As illustrated in FIGS. 7-8*b*, the filament $\mathbf{11}_f$ can have a shape to increase electron emission in desired directions and to suppress electron emission in undesired directions. These characteristics can provide a smaller and a more controlled electron spot on the x-ray tube target 14.

Also, because fewer electrons are emitted in undesirable directions, the filament $\mathbf{11}_f$ can be more efficient. Thus, temperature of the filament $\mathbf{11}_f$ can be reduced for a given x-ray flux. Reducing filament $\mathbf{11}_f$ temperature can increase filament $\mathbf{11}_f$ life, and thus also x-ray tube life. Increased x-ray tube life reduces energy and materials expended to manufacture x-ray tubes, thus improving the environment. Also, there is less need for waste disposal because of fewer scrapped x-ray tubes.

Reducing filament $\mathbf{11}_f$ temperature can also reduce power consumption, thus improving the environment. Reduced power consumption allows use of a smaller battery in a portable x-ray source, thus reducing x-ray tube weight. This reduces operator fatigue and improves ergonomics of use.

As illustrated in FIGS. 5*a*-*b*, the filament $\mathbf{11}_f$ can include a top-material TM at the top-side $\mathbf{31}_t$ and a bottom-material BM at the bottom-side $\mathbf{31}_b$. The top-material TM can adjoin the bottom-material BM. The bottom-material BM can suppress electron emission from the bottom-side $\mathbf{31}_b$. The top-material TM can increase electron emission from the top-side $\mathbf{31}_t$.

The top-material TM and the bottom-material BM can be different materials with respect to each other. A work function $WF_t$ of the top-material TM can be lower than a work function $WF_b$ of the bottom-material BM ($WF_t < WF_b$).

As illustrated in FIG. 5*b*, the bottom-material BM can also coat the two edges $\mathbf{31}_e$ of the filament $\mathbf{11}_f$. Thus, the bottom-material BM can also suppress electron emission from the two edges $\mathbf{31}_e$. The bottom-material BM can be a continuous layer, covering the bottom-side $\mathbf{31}_b$ and the two edges $\mathbf{31}_e$ with a thin film.

It is useful to suppress electron emission from the bottom-side $\mathbf{31}_b$, from the two edges $\mathbf{31}_e$, or both. An initial trajectory of these electrons is not towards the target 14. Many of these electrons can hit undesirable locations, such as the electrically-insulative structure 15. This can put an electrical charge on the electrically-insulative structure 15, which can deflect the electron beam or cause arcing failure of the tube. Thus, suppression of electron emission from the bottom-side $\mathbf{31}_b$ and from the two edges $\mathbf{31}_e$ improves x-ray tube reliability and life. This can improve efficiency of the worker, increasing output, and can reduce strain on the environment.

Without the invention, some of the electrons emitted in undesirable directions can change their trajectory and reach the target 14; but relatively few will hit a center of the target 14. Thus, they can cause an undesirably large or distorted spot. This can reduce accuracy and efficiency of x-ray imaging and x-ray diffraction spectroscopy. Therefore, suppressing emission of electrons from the bottom-side $\mathbf{31}_b$ and from the two edges $\mathbf{31}_e$ is desirable. One example of the invention suppresses this emission by use of the bottom-material BM.

The filament $\mathbf{11}_f$ of FIG. 5*b* is preferable over the filament $\mathbf{11}_f$ of FIG. 5*a* for suppressing electron emission in undesirable directions. The filament $\mathbf{11}_f$ of FIG. 5*a*, however, might be preferred for manufacturability.

The filament $\mathbf{11}_f$ of FIG. 5*a* can be made by sputter deposition of the bottom-material BM on a sheet of the top-material TM, or sputter deposition of the top-material TM on a sheet of the bottom-material BM. A laser can then ablate material of the sheet to form a shape of the filament $\mathbf{11}_f$.

The filament $\mathbf{11}_f$ of FIG. 5*b* can be made by cutting a sheet of the top-material TM to form a shape of the filament $\mathbf{11}_f$. The bottom-material BM can be sputter deposited at the bottom-side $\mathbf{31}_b$ and on the two edges $\mathbf{31}_e$. Oblique angle deposition from multiple angles may be needed to deposit the bottom-material BM on the two edges $31_e$.

As illustrated in FIGS. 6*a*-6*c*, the filament $11_f$ can include a core-material CM between the top-material TM and the bottom-material BM. As illustrated in FIGS. 6*b*-6*c*, the top-material TM and the bottom-material BM can encircle the core-material CM. The top-material TM and the bottom-material BM can enclose completely the core-material CM.

The top-material TM, the bottom-material BM, and the core-material CM can be different materials with respect to each other. The top-material TM can have a lowest work function $WF_t$; the bottom-material BM can have a highest work function $WF_b$; and the core-material CM can have an intermediate work function $WF_c$ ($WF_t<WF_c<WF_t$). This arrangement of materials, with work function as noted, can increase electron emission from the top-side $31_t$, which faces the target 14, and decrease electron emission from the bottom-side $31_b$ (and also at the two edges $31_e$ for filaments $11_f$ of FIGS. 6*b*-6*c* and 8*a*-8*b*). Thus, more electrons can be directed to a smaller spot on the target 14.

The filament $11_f$ of FIG. 6*a* can be made by sputter deposition of (a) the bottom-material BM on one side of a sheet of the core-material CM, and (b) the top-material TM on an opposite side of a sheet of the core-material CM. These steps may be performed in either order. A laser can then ablate material of the sheet to form a shape of the filament $11_f$. The laser can cut from the bottom-material BM side, from the top-material TM side, or both.

The filament $11_f$ of FIG. 6*b* can be made by cutting a sheet (e.g. laser ablation) of the core-material CM to form a shape of the filament $11_f$. The bottom-material BM can then be sputter deposited at the bottom-side $31_b$ and on the two edges $31_e$. Oblique angle deposition of the bottom-material BM from multiple angles may be needed to deposit the bottom-material BM on the two edges $31_e$. The top-material TM can be sputter deposited at the top-side $31_t$.

The filament $11_f$ of FIG. 6*c* can be made by cutting a sheet (e.g. laser ablation) of the core-material CM to form a shape of the filament $11_f$. The top-material TM can be sputter deposited at the top-side $31_t$. Alternatively, the top-material TM can be sputter deposited at the top-side $31_t$ prior to laser ablation, and the core-material CM and the top-material TM can be cut together. The bottom-material BM can then be sputter deposited at the bottom-side $31_b$ and on the two edges $31_e$. Oblique angle deposition of the bottom-material BM from multiple angles may be needed to deposit the bottom-material BM on the two edges $31_e$.

The filaments $11_f$ of FIGS. 6*a*-6*c* are preferable over the filaments $11_f$ of FIGS. 5*a* and 5*b* if a top-material TM, with low work function $WF_t$, lacks other desirable characteristics. For example, hafnium (preferred as a top-material TM) has a low work function (desirable), but is also expensive (undesirable). Cost of the filament $11_f$ can be reduced by adding a less expensive core material CM (e.g. tungsten), thus reducing the mass and cost of hafnium in the filament $11_f$.

Example top-materials TM include barium, cesium, hafnium, thorium, or combinations thereof. Example core-materials CM include tungsten, molybdenum, titanium, or combinations thereof. Example bottom-materials BM include cobalt, copper, gold, iridium, iron, nickel, osmium, rhenium, rhodium, ruthenium, or combinations thereof.

Tungsten, molybdenum, and titanium could also be top-materials, especially in the example of FIGS. 5*a*-*b*, with no separate core-material CM. Thus, example materials for the top-material TM include barium, cesium, hafnium, thorium, tungsten, molybdenum, titanium, or combinations thereof.

The top-material TM, the core-material CM, and the bottom-material BM can include a high percent of a single element, such as for example ≥50, ≥75, ≥90, or ≥98 weight percent of one of the elements noted in the preceding paragraphs.

Factors to consider in selection of these materials include cost, work function ($WF_t<WF_c<WF_b$), melting temperature (high enough to not melt during operation), low vapor pressure (avoid degrading the vacuum inside the tube), and durability of the coating (avoid flaking). Another factor to consider is reactivity. The filament $11_f$ can fail if it reacts with gases and changes its chemical composition. For the bottom-material BM, the ability to braze to filament supports is another factor to consider.

The bottom-material BM can have a thickness $Th_b$ sufficiently large to aid in soldering to a support, and to suppress electron emission, but not too thick in order to avoid flaking. Example thicknesses $Th_b$ of the bottom-material BM in the final filament $11_f$ include 0.2 $\mu m \le Th_b$, 1 $\mu m \le Th_b$, or 2.5 $\mu m \le Th_b$; and $Th_b \le 2.5$ μm, $Th_b \le 5$ μm, $Th_b \le 15$ μm.

The top-material TM can have a thicknesses $Th_t$ sufficiently large to increase electron emission, but not too thick to distract from valuable attributes of the core material CM, bottom-material BM, or both. Example thicknesses $Th_t$ of the top-material TM in the final filament $11_f$ include 0.2 $\mu m \le Th_t$, 1 $\mu m \le Th_t$, or 2.5 $\mu m \le Th_t$; and $Th_t \le 5$ μm, $Th_t \le 10$ μm, $Th_t \le 20$ μm.

As illustrated in FIG. 7, a width $W_t$ of the wire 31 at the top-side $31_t$ can be greater than a width $W_b$ of the wire 31 at the bottom-side $31_b$ ($W_t>W_b$). This shape can help direct more electrons to a center of the target 14, and reduce electron emission in undesired directions. This shape also can make it easier to coat the edges $31_e$ with the bottom-material BM, because the edges $31_e$ tilt toward and partially face the sputter target. Example relationships between $W_t$ and $W_b$ include $1.05 \le W_t/W_b$, $1.2 \le W_t/W_b$, $1.4 \le W_t/W_b$, or $1.5 \le W_t/W_b$; and $W_t/W_b \le 1.5$, $W_t/W_b \le 1.75$, $W_t/W_b \le 2$, $W_t/W_b \le 5$, or $W_t/W_b \le 25$. Both widths $W_t$ and $W_b$ can be measured perpendicular to a length of the wire 31.

An internal angle $A_i$ of the filament $11_f$, between the top-side $31_t$ and each of the edges $31_e$, can also be selected to achieve the benefits mentioned in the prior paragraph. For example, $A_i \le 85°$, $A_i \le 80°$, or $A_i \le 70°$; and $A_i \ge 20°$, $A_i \ge 45°$, $A_i \ge 60°$, or $A_i \ge 70°$. The filament $11_f$ can have such angle $A_i$ along a large portion of its length, such as for example along at least 50%, 80%, 95%, or 100% of a length of the filament $11_f$.

Example cross-sectional shapes of the filament $11_f$ include trapezoid and triangle shapes. The top-side $31_t$ can be parallel to the bottom-side $31_b$. The two edges $31_e$ can be unparallel with respect to each other. The two edges $31_e$ can extend linearly between the top-side $31_t$ and the bottom-side $31_b$.

The above shapes can be formed by patterning the bottom-side $31_b$, then isotropic etching. The above shapes can be formed by cutting the filament $11_f$ with a laser. More laser time can be used at a center of a gap between adjacent wires 31. Laser time can taper down moving closer toward a center of the wire 31. The amount of taper can be adjusted between gradual and sharp, to change the angle $A_i$ and $W_t/W_b$.

A relationship, between a width $W_t$ of the wire 31 at the top-side $31_t$ and a thickness $Th_w$ of the wire 31, can be selected for improved overall strength of the wire 31 and increased emission of electrons from the top-side $31_t$. For example, $1.2 \le W_t/Th_w$, $1.4 \le W_t/Th_w$, or $1.9 \le W_t/Th_w$; and $W_t/Th_w \le 1.9$, $W_t/Th_w \le 3$, $W_t/Th_w \le 5$. The width $W_t$ can be selected by the pattern of the desired shape. The thickness $Th_w$ can be selected by choice of initial material thickness, plus coatings, if any. $Th_w$ is a thickness of the wire 31 between the top-side 31$_t$ and the bottom-side 31$_b$, measured perpendicular to a plane of the top-side 31$_t$.

The top-material TM can cover all of the top-side 31$_t$. But, it can be useful to cover a smaller percentage of the surface. Illustrated in FIG. 9 are central regions 91 and 92. By coating the top-side 31$_t$ with the top-material TM within one of these central regions 91 or 92, the electron beam can be narrowed, with a larger portion of the electron beam coming from a center of the filament 11$_f$. This can form a very small spot on the target 14, which is valuable for some applications.

By covering only the central region 91 or 92 of the filament 11$_f$ with the top-material TM, each end of the wire 31 can be free of the top-material TM. To do this, layer(s) of material for the filament 11$_f$ can be patterned to block ends of the wire 31, and leave a central region 91 or 92 open while depositing the top-material TM. Thus, the top-material TM can be deposited only in the central region 91 or 92. This patterning and deposition can be done before or after cutting to form the wires 31. Thus for example, the top-material TM can cover ≥5%, ≥25%, or ≥50%; and ≤50%, ≤80%, or ≤90% of the top-side 31$_t$, which coverage can be or include the central region 91 or 92.

It is preferable for the bottom-material BM to cover all or nearly all of the bottom-side 31$_b$ and of the two edges 31$_e$, such as for example ≥75%, ≥90%, or ≥95% of the bottom-side 31$_b$ and the two edges 31$_e$.

A width $W_t$ of the wire 31 and a width $W_g$ of a gap between adjacent wires 31 is illustrated in FIGS. 3-4 and 10. Both the width $W_t$ of the wire 31 and the width $W_g$ of a gap are measured at the top-side 31$_t$ of the wire 31 and perpendicular to a length of the wire 31 (i.e. perpendicular to the length at the point of measurement).

In FIGS. 3-4, the width $W_g$ of the gap is larger than the width $W_t$ of the wire 31 ($W_g>W_t$), except for a small central region of the wire 31. In FIG. 10 the width $W_t$ of the wire 31 is greater than the width $W_g$ of the gap ($W_t>W_g$). The smaller gap in FIG. 10 ($W_t>W_g$) increases radiative cross heating between adjacent parts of the wire 31. This allows a smaller electrical current to produce the same temperature, thus saving electrical power.

Duty cycle DC is used to quantify the relationship between $W_t$ and $W_g$($DC=W_t/W_g$). Example duty cycles DC, for balancing heating efficiency with robustness of the filament 11$_f$, include 1.05≤DC, 1.15≤DC, or 1.25≤DC; and DC≤1.25, DC≤1.5, DC≤2. The duty cycles DC can apply across the entire filament 11$_f$. Alternatively, the duty cycle DC values just noted can be an average across a limited portion of the filament 11$_f$, such as for example ≥50%, ≥75%, or ≥90%; and ≤99% of a central region of the filament 11$_f$.

What is claimed is:

1. An x-ray tube comprising:

a cathode and an anode electrically insulated from one another, the cathode including a filament configured to emit electrons to a target at the anode, the target configured to emit x-rays in response to impinging electrons from the filament;

the filament being an elongated wire in a planar shape with a top-side facing the target, a bottom-side opposite of the top-side, and two edges, opposite of each other, extending between the top-side and the bottom-side, the top-side aligned with a first plane, and the bottom-side aligned with a second plane, the first plane being parallel to the second plane;

the filament has a top-material at the top-side, a bottom-material at the bottom-side and at the two edges, and a core-material between the top-material and the bottom-material;

the top-material, the bottom-material, and the core-material are different materials with respect to each other; and $WF_t<WF_c<WF_b$, where $WF_t$ is a work function of the top-material, $WF_c$ is a work function of the core-material, and $WF_b$ is a work function of the bottom-material.

2. The x-ray tube of claim 1, wherein the top-material includes ≥98 weight percent hafnium.

3. The x-ray tube of claim 1, wherein the bottom-material includes ≥90 weight percent of at least one of cobalt, copper, gold, iridium, iron, nickel, osmium, rhenium, rhodium, or ruthenium.

4. The x-ray tube of claim 1, wherein the core-material includes at least one of tungsten, molybdenum, titanium, or combinations thereof.

5. The x-ray tube of claim 1, wherein the top-material includes ≥90 weight percent of at least one of barium, cesium, thorium, tungsten, molybdenum, or titanium.

6. The x-ray tube of claim 1, wherein $1.05\leq W_t/W_b\leq 1.75$, where $W_t$ is a width of the wire measured at the top-side and perpendicular to a length of the wire and $W_b$ is a width of the wire measured at the bottom-side and perpendicular to the length of the wire.

7. The x-ray tube of claim 1, wherein $1.2\leq W_t/Th_w\leq 3$, where $W_t$ is a width of the wire measured at the top-side and perpendicular to a length of the wire and $Th_w$ is a thickness of the wire between the top-side and the bottom-side, measured perpendicular to a plane of the top-side.

8. The x-ray tube of claim 1, wherein:

0.2 μm≤$Th_b$≤5 μm, where $Th_b$ is a thickness of the bottom-material; and

1 μm≤$Th_t$≤5 μm, where $Th_t$ is a thicknesses of the top-material.

9. The x-ray tube of claim 1, wherein 60°≤$A_i$≤85°, where $A_i$ is an internal angle of the filament between the top-side and each of the edges.

10. The x-ray tube of claim 1, wherein $W_t/W_b\leq 1.5$, where $W_t$ is a width of the wire measured at the top-side and perpendicular to a length of the wire and $W_b$ is a width of the wire measured at the bottom-side and perpendicular to the length of the wire.

11. The x-ray tube of claim_1, wherein the top-material covers ≥5% and ≤80% of the top-side, including a central region of the elongated wire.

12. The x-ray tube of claim 1, wherein an average duty cycle (DC) is ≥1.05 and ≤1.5 across ≥ 50% of a central region of the filament, where $DC=W_t/W_g$, $W_t$ is a width of the wire measured at the top-side and perpendicular to a length of the wire, and $W_g$ is a width of a gap between adjacent wires measured at the top-side and perpendicular to the length of the wire.

13. An x-ray tube comprising:

a cathode and an anode electrically insulated from one another, the cathode including a filament configured to emit electrons to a target at the anode, the target configured to emit x-rays in response to impinging electrons from the filament;

the filament being an elongated wire in a planar shape with a top-side facing the target, a bottom-side opposite of the top-side, and two edges, opposite of each other, extending between the top-side and the bottom-side, the top-side aligned with a first plane, and the bottom-side aligned with a second plane, the first plane being parallel to the second plane;

the filament has a top-material at the top-side and a bottom-material at the bottom-side; and the top-material is different from the bottom-material;

the top-material includes ≥98 weight percent hafnium; and the bottom-material includes ≥90 weight percent of at least one of cobalt, copper, gold, iridium, iron, nickel, osmium, rhenium, rhodium, or ruthenium.

14. The x-ray tube of claim 13, further comprising:

a core-material between the top-material and the bottom-material;

the top-material, the bottom-material, and the core-material are different materials with respect to each other; and $WF_T < WF_c < WF_b$, where $WF_t$ is a work function of the top-material, $WF_c$ is a work function of the core-material, and $WF_b$ is a work function of the bottom-material.

15. The x-ray tube of claim 13, wherein $1.05 \leq W_t/W_b \leq 1.75$, where $W_t$ is a width of the wire measured at the top-side and perpendicular to a length of the wire and $W_b$ is a width of the wire measured at the bottom-side and perpendicular to the length of the wire.

16. The x-ray tube of claim 13, wherein $1.2 \leq W_t/Th_w \leq 3$, where $W_t$ is a width of the wire measured at the top-side and perpendicular to a length of the wire and $Th_w$ is a thickness of the wire between the top-side and the bottom-side, measured perpendicular to a plane of the top-side.

17. The x-ray tube of claim 13, wherein:

$0.2\ \mu m \leq Th_b \leq 5\ \mu m$, where $Th_b$ is a thickness of the bottom-material; and $1\ \mu m \leq Th_t \leq 5\ \mu m$, where $Th_t$ is a thicknesses of the top-material.

18. The x-ray tube of claim 13, wherein $60° \leq A_i \leq 85°$, where $A_i$ is an internal angle of the filament between the top-side and each of the edges.

19. The x-ray tube of claim 13, wherein the top-material covers ≥5% and ≤80% of the top-side, including a central region of the elongated wire.

20. The x-ray tube of claim 13, wherein an average duty cycle (DC) is ≥1.05 and ≤1.5 across ≥50% of a central region of the filament, where $DC = W_t/W_g$, $W_t$ is a width of the wire measured at the top-side and perpendicular to a length of the wire, and $W_g$ is a width of a gap between adjacent wires measured at the top-side and perpendicular to the length of the wire.

* * * * *